May 13, 1952  B. MILLER  2,596,422
LEVEL AND INCLINOMETER
Filed Jan. 10, 1950  2 SHEETS—SHEET 1
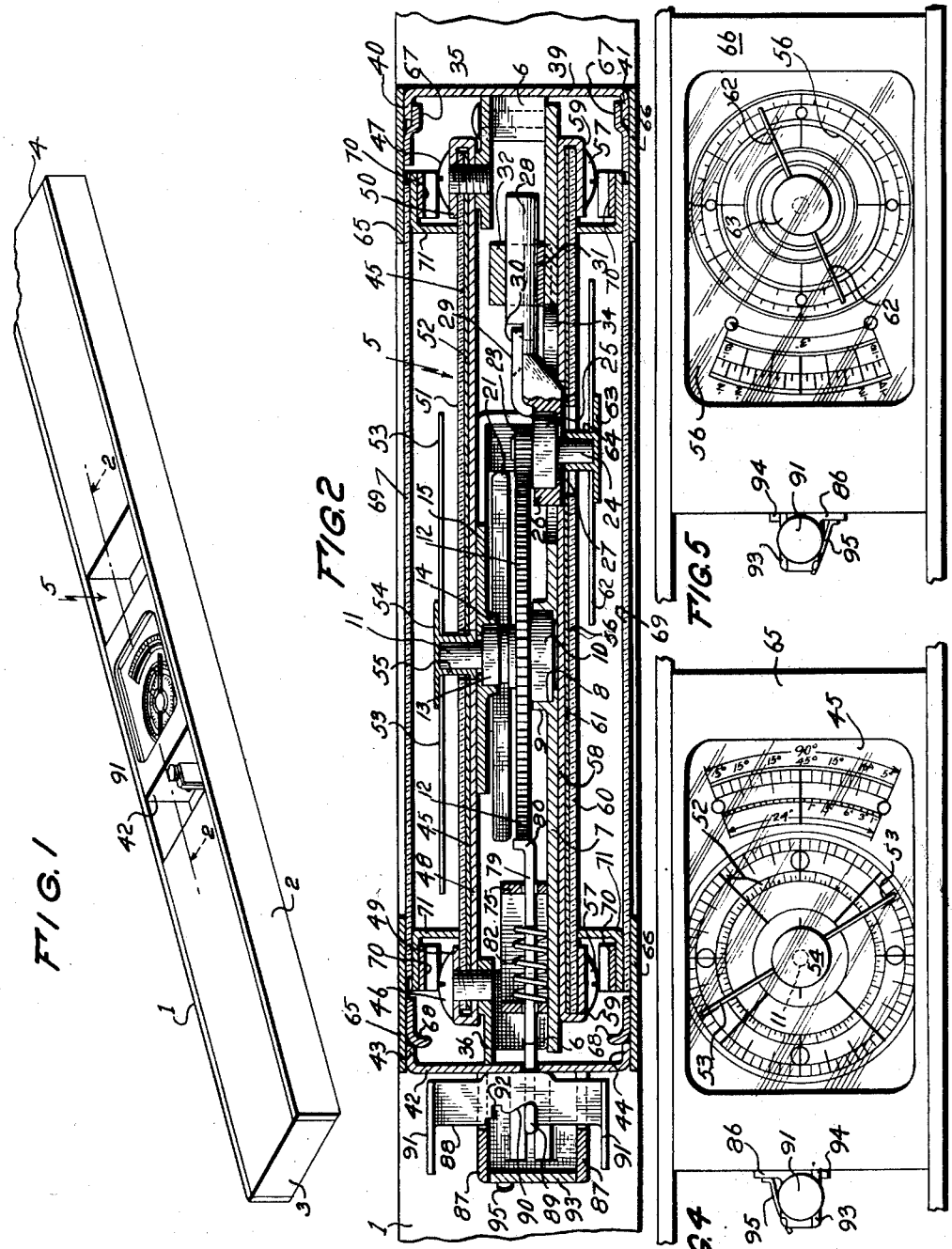
INVENTOR
BARNET MILLER
BY Elmer J. Gorn
ATTORNEY May 13, 1952     B. MILLER     2,596,422
LEVEL AND INCLINOMETER
Filed Jan. 10, 1950     2 SHEETS—SHEET 2
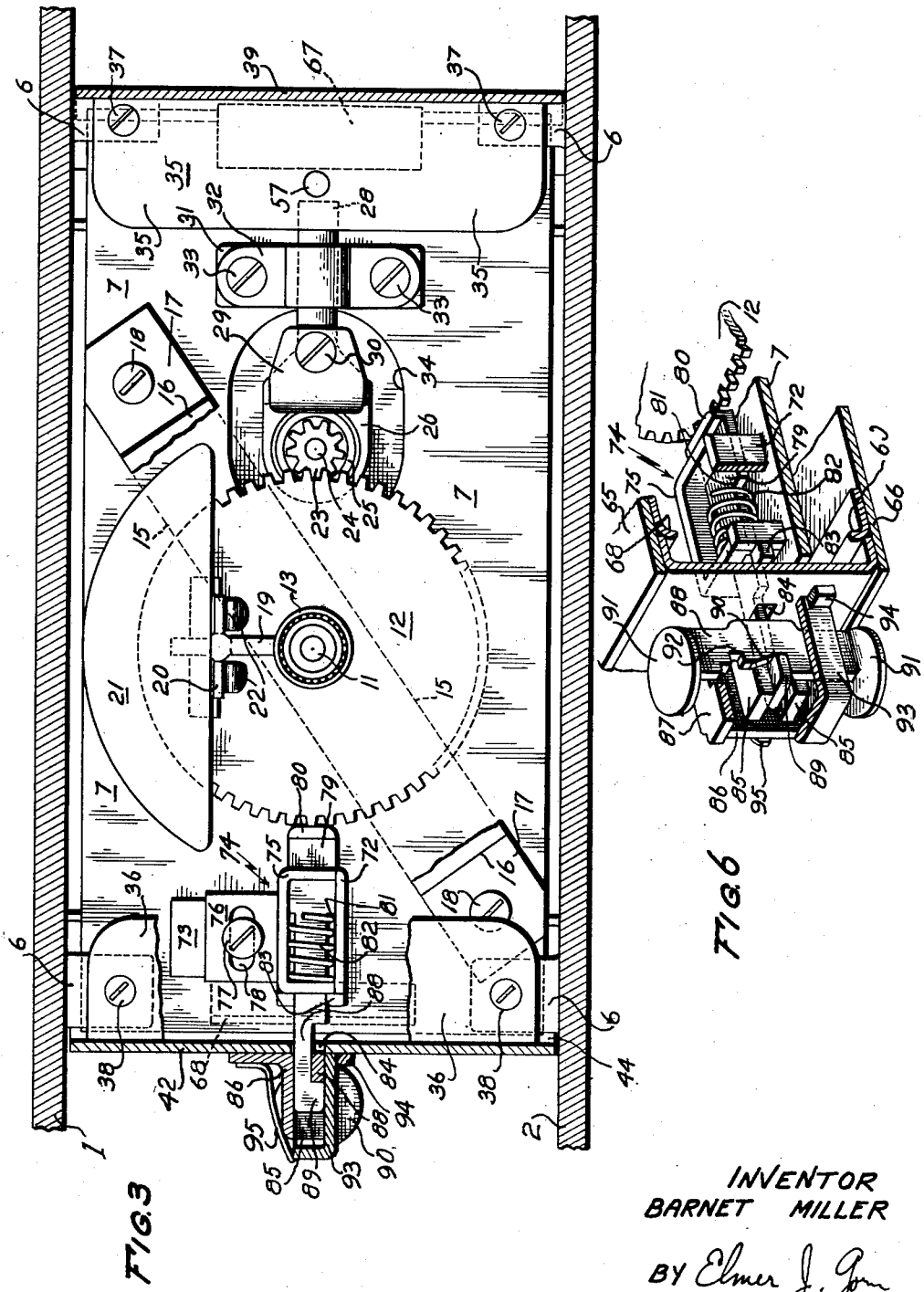
INVENTOR
BARNET MILLER
BY Elmer J. Gorn
ATTORNEY Patented May 13, 1952

2,596,422

UNITED STATES PATENT OFFICE 2,596,422

LEVEL AND INCLINOMETER

Barnet Miller, Hartford, Conn.

Application January 10, 1950, Serial No. 137,771

5 Claims. (Cl. 33—221)

This invention relates to an inclinometer, and more particularly to such a device in which a gravity-operated mechanism is caused to operate a plurality of indicators associated with scales to indicate such information as the level degrees of inclination or the rise of inches per foot of such inclination.

In devices of this kind, the distance at which the gravity member may be supported from a pivot point is necessarily limited, as is the weight of such member. Therefore, the total turning force which the gravity member can exert on the driving member of the indicating mechanism is correspondingly necessarily limited. As a result, difficulties have heretofore been encountered in devising such a device in which stalling of the mechanism would be avoided under all operating conditions without undue enlargement and complication of the structure. The present invention provides such an arrangement and in particular provides for a simple support for one member of the gear train comprising the drive for the indicating mechanism whereby the operator may, by a simple adjustment, cause the gear train to assume a position of proper alignment in which binding or stalling effects are reduced to a minimum.

This invention also provides for a novel brake mechanism to set the indicating mechanism upon its reaching a position of equilibrium for any particular measurement. This brake mechanism is one in which the setting and releasing member is set in such position relative to the operator's hand so as to be operable with a maximum of ease. Also, by causing the brake shoe to engage the peripheral teeth in the largest gear of the indicator drive mechanism, all tendency for the mechanism to shift after having been set by the brake is eliminated.

By a novel relationship of the parts, the entire assembly is made extremely compact so as to be incorporated in a structure which is no larger or heavier than a standard carpenter's level.

In addition, the mechanism is readily assembled and disassembled due to its novel structure whereby the repair and adjustment thereof are greatly facilitated.

In the accompanying drawings showing the preferred embodiment of this invention:

Fig. 1 is a perspective view of an inclinometer incorporating the present invention;

Fig. 2 is a cross section, in enlarged scale, taken along line 2—2 of Fig. 1;

Fig. 3 is a top plan view of the mechanism shown in Fig. 2 with the cover window, indicator and indicator scale removed;

Fig. 4 is a view of one of the indicator scales showing the degrees of inclination;

Fig. 5 is a view of the other indicator scale showing the rise of inches per foot for the inclination being measured; and Fig. 6 is an enlarged perspective view of the brake mechanism.

The inclinometer illustrated comprises a supporting body having plane upper and lower faces 1 and 2 formed by metal strips. These strips are held in spaced, parallel relation by a pair of metal blocks 3 and 4 which also have plane, parallel end faces. If desired, these blocks may be hollow. The blocks 3 and 4 are secured to the strips 1 and 2 in any suitable manner. The inner ends of blocks 3 and 4 are spaced apart to provide a space 5 in which my novel indicator assembly is located.

Secured to the inner faces of the strips 1 and 2 within the space 5 are four support blocks 6 for supporting the indicator assembly. The four corners of the assembly base plate 7 are fastened to the lower side of the blocks 6 as viewed in Fig. 2 by fastening means such as screws (not shown). The center of the base plate 7 is provided with an opening 8 surrounded by an annular shoulder 9 within which is supported a ball bearing assembly 10. The ball bearing assembly 10, in turn, carries a shaft 11 freely rotatable therein. To the shaft 11 is secured a large gear 12. The outer end of the shaft 11 passes through, and is freely rotatable in, a ball bearing assembly 13 which is held in place by an annular shoulder 14 formed around a central opening in a bracket 15. This bracket, as shown in Fig. 3, is provided with a pair of depending legs 16 having feet 17 through which pass screws 18 which fasten the bracket 15 to the base plate 7.

Intermediate the gear 12 and the ball bearing assembly 13 is secured an elongated rod 19. This rod carries a cross bar 20 to which is clamped a weight 21 by means of a pair of spring clamps 22. In order to steady the weight 21, the rod 19 projects into a hole therein (not shown). This is a convenient way of detachably supporting the weight 21 although it may be permanently secured in place by any suitable fastening arrangement on the rod 19.

The large gear 12 meshes with a smaller gear 23 secured to a shaft 24 which extends through and is freely rotatable in a ball bearing assembly 25. This ball bearing assembly is supported in a ring 26 having a retaining lip 27 at its lower edge to retain the ball bearing assembly 25. The ring 26 is formed at the outer end of a round bar 28 which is clamped to the base plate 7 as will be described below. The ball bearing assembly 25 is clamped in place by a clamping bar 29 fastened in position on the bar 28 by a screw 30. Fastened to the base plate 7, as by soldering, is a block 31 having a semicircular recess therein to receive the bar 28. A clamping bar 32, having a complementary semicircular depression, is clamped to the block 31 by screws 33 thus clamping the bar 28 in place. By loosening the screws 33, the bar 28 may be slid along its longitudinal axis and also may be rotated about that axis while bearing in the circular space provided by the cooperating semicircular recesses in the block 31 and the bar 32. The rotation of the bar 28 enables the surfaces of the gear teeth of gear 25 to be accurately oriented so as to be parallel with the surfaces of the gear teeth of gear 12 with which they engage. The longitudinal adjustment of bar 28 insures proper meshing of these gear teeth without binding. Thus the bar carrying the gear 25 is readily adjustable to provide the proper orientation and alignment of the gears 12 and 25 to produce a minimum of binding and a maximum of freedom of motion of the mechanism. The base plate 7 is cut away at 34 to allow room for the ring 25.

To the top side of the blocks 6 are fastened two supporting bars 35 and 36 which are secured in place by screws 37 and 38. The bar 35 has secured, at right angles thereto, an end plate 39 provided with upper and lower retaining lips 40 and 41. Likewise, the bar 36 has secured, at right angles thereto, an end plate 42 having upper and lower retaining lips 43 and 44. An upper scale 45 is secured to the supporting bars 35 and 36 by screws 46 and 47. The scale 45 is formed from a metal sheet 48 folded over at its ends to provide lips 49 and 50 which retain a transparent plastic sheet 51. Between the sheets 48 and 51 is retained a sheet 52 of a suitable material, such as paper, upon which is printed a scale calibrated in degrees and minutes as shown in Fig. 4. The shaft 11 projects through a central hole in the scale 45 and carries a double-ended pointer 53. This pointer has a central plate 54 from which depends a hollow hub 55 which frictionally engages the outer end of the shaft 11.

A second scale 56, similar in construction to scale 45, is secured to the face of the base plate 7 by screws 57 tapped into said base plate. This scale also is formed from a metal sheet 58 having end lips 59 retaining a transparent plastic sheet 60. Here, the sheet 61, retained between the sheets 58 and 60, is printed with a scale calibrated in inches rise per foot as shown in Fig. 5. The shaft 24 projects through a central hole in scale 56 and carries a double-ended pointer 62. This pointer has a central plate 63 provided with a hollow hub 64 frictionally engaging the outer end of shaft 24.

The two sides of the indicator mechanism are closed by cover plates 65 and 66. Each plate is retained in place by a lip member 67 hooking over one of the lips 40 and 41, and, by a spring plate member 68, snapping over one of the other lip members 43 and 44. Transparent windows 69 are secured in place in each of the cover plates 65 and 66. This is done by fastening a pair of bars 70 across the inside end surfaces of the cover plates 65 and 66. Angle bars 71 each have one wing inserted between a bar 70 and the inner surface of the corresponding plate 65 or 66 to thereby clamp the windows 69 in place. The other wing of each angle bar 71 serves to properly space the scales 45 and 56 below the windows.

When the level is placed with one of the strips 1 or 2 along a surface whose inclination is to be measured, it is usually desired to clamp the mechanism in place so that the scales 45 and 56 may be read when the level is moved from such surface. For this purpose, the mechanism is provided with a brake mechanism as shown most clearly in Figs. 3 and 6. Fastened to the base plate 7 by suitable means, such as soldering, is an upstanding plate 72. Spaced from the plate 72 and likewise fastened to the base plate 7 is another plate 73. These plates 72 and 73 form guide members between which is fitted a brake bracket 74 consisting of a U-shaped frame 75 and a bar 76. The bracket 74 is adjustable in a direction toward and away from the large gear 12 between the guide plates 72 and 73 and may be secured in its adjusted position by a screw 77 extending through an elongated slot 78 in the bar 76 into a tapped hole in the base plate 7. The two side arms of the U-shaped frames 75 are provided with slots through which passes a brake arm 79 having a brake shoe 80 which may engage the outer edges of the gear teeth on the large gear 12 to clamp the indicator mechanism in place. The arm 79 is cut away to provide a shoulder 81 to engage a spring 82, compressed between the shoulder 81 and one arm of the U-shaped frame 75, to urge the brake shoe into engagement with the gear 12. To guide the bracket 74 during its adjustment, the plate 72 is provided with a guide bar 83 also received in one of the slots through which the arm 79 passes. The plate 42 is provided with an opening 84 through which a reduced portion of the arm 79 projects. This end of the arm 79 is guided in its motion by a pair of guide plates 85 secured to a bracket 86, also soldered to the outside of plate 42. The bracket 86 is provided with a pair of end plates 87 recessed to receive a cam arm 88. The outer end of the arm 79 is provided with a cam follower 89 adapted to follow a cam surface 90 cut into the cam arm 88 between the plates 87. The opposite ends of the cam arm 88 are provided with plates 91 whereby the fingers of the operator may readily engage these plates to move the cam arm from one position to another. It will be seen that, in one position, the cam arm releases the brake so that the spring 82 may move the brake into clamping position and, in the opposite position, the cam arm retracts the brake arm 79 against the action of the spring 82 to release the brake. It will also be seen that the two plates 91 are located just below the plates of the sides of the level where the fingers of the operator are most usually located in holding the level, and thus the brake can be operated with a maximum of ease. Beyond the high end of the cam surface 90 is located a recess 92 to receive the cam follower 89 in its retracted position whereby there is no tendency for the brake to be set unless positively operated by the fingers of the person using the level. The low end of the cam surface 90 accomplishes the same purpose in the other position of the brake. In order to hold the cam arm 88 in place, a cover plate 93 is snapped into position between a bar 94 fastened to the plate 42 and a leaf spring 95 mounted on the bracket 86.

The level may be provided on the surfaces of the blocks 3 and 4 with suitable conversion tables and other information useful in connection with the full utilization of the device.

What is claimed is:

1. An inclinometer comprising a body member having a plane surface adapted to serve as a measuring surface, a shaft journalled on said body, a weight eccentrically mounted on said shaft, a drive gear mounted on said shaft, a smaller gear engaging said drive gear, said smaller gear mounted on another shaft journalled in a carrying member mounted at the end of an elongated circular bar extending at right angles to the axes of rotation of said gears, said bar being slidably and rotatably adjustable in a clamp mounted on said body member, an indicating pointer carried by each of said shafts, and a scale on said body adjacent each of said pointers.

2. An inclinometer comprising a body member having a plane surface adapted to serve as a measuring surface, a shaft journalled on said body, a weight eccentrically mounted on said shaft, a drive gear mounted on said shaft, a smaller gear engaging said drive gear, said smaller gear mounted on another shaft also journalled on said body, a brake member having a brake shoe mounted adjacent said drive gear, said brake shoe having a width substantially greater than the distance between adjacent teeth of said drive gear, and means for moving said brake shoe into engagement with the outer ends of the teeth of said drive gear.

3. An inclinometer comprising a body member having a plane surface adapted to serve as a measuring surface, a shaft journalled on said body, a weight eccentrically mounted on said shaft, a drive gear mounted on said shaft, a smaller gear engaging said drive gear, said smaller gear mounted on another shaft also journalled on said body, a brake member having a brake shoe mounted adjacent said drive gear, said brake shoe having a width substantially greater than the distance between adjacent teeth of said drive gear, spring means for moving said brake shoe into engagement with the outer ends of the teeth of said drive gear, and a cam bar for engaging said brake member for retracting said brake shoe from engagement with said drive gear against the biasing action of said spring means.

4. An inclinometer comprising a body member having the shape of an elongated bar, an opening extending through the center of said body member, a supporting plate mounted in said opening, a shaft journalled in said plate, a weight eccentrically mounted on said shaft, a drive gear mounted on said shaft, a smaller gear engaging said drive gear, said smaller gear mounted on another shaft journalled in a carrying member mounted at the end of an elongated circular bar extending at right angles to the axes of rotation of said gears, said bar being slidably and rotatably adjustable in a clamp mounted on said plate, an indicating pointer carried by each of said shafts, and a scale on said body adjacent each of said pointers.

5. An inclinometer comprising a body member having the shape of an elongated bar, an opening in said body member, a supporting plate mounted in said opening, a shaft journalled in said plate, a weight eccentrically mounted on said shaft, a drive gear mounted on said shaft, a smaller gear engaging said drive gear, said smaller gear mounted on another shaft journalled in a carrying member mounted at the end of an elongated circular bar extending at right angles to the axes of rotation of said gears, said bar being slidably and rotatably adjustable in a clamp mounted on said plate, an indicating pointer carried by each of said shafts, a scale on said body adjacent each of said pointers, a pair of window frames mounted over said scales, each of said window frames being releasably clipped to end plates carried by said supporting plate, and transparent windows mounted in said frames by means of angle bars retained at the ends of said windows by transverse bars secured to the lower sides of said window frames.

BARNET MILLER.

REFERENCES CITED

The following references are of record in the file of this patent:

UNITED STATES PATENTS

| Number | Name | Date |
|---|---|---|
| 221,380 | Winter | Nov. 4, 1879 |
| 397,010 | Lewis | Jan. 29, 1889 |
| 532,515 | Woodworth | Jan. 15, 1895 |

FOREIGN PATENTS

| Number | Country | Date |
|---|---|---|
| 117,812 | Great Britain | 1919 |